United States Patent [19]

Jose et al.

[11] Patent Number: 4,523,105
[45] Date of Patent: Jun. 11, 1985

[54] FULL WAVE RECTIFIER CIRCUIT FOR SMALL SIGNALS

[75] Inventors: David L. Jose, Hamilton Square; Winthrop S. Pike, Princeton; Jack Craft, Bridgewater, all of N.J.

[73] Assignee: RCA Corporation, Princeton, N.J.

[21] Appl. No.: 424,264

[22] Filed: Sep. 27, 1982

[51] Int. Cl.³ .......................... H03K 5/08; H03K 5/13
[52] U.S. Cl. ...................................... 307/261; 328/26; 363/127; 307/260; 307/490; 307/496; 307/494; 330/257; 330/261; 330/252; 323/315; 329/166
[58] Field of Search .................. 328/26; 330/252, 257, 330/261; 307/260, 261, 491, 493, 494, 496, 500; 363/127; 323/315; 329/166

[56] References Cited

U.S. PATENT DOCUMENTS

| 3,566,145 | 2/1971 | Goodale | 307/235 |
| 4,336,586 | 6/1982 | Lunn | 363/127 |
| 4,360,866 | 11/1982 | Main et al. | 363/127 |
| 4,445,054 | 4/1984 | Ishii | 307/555 |

FOREIGN PATENT DOCUMENTS

| 36656 | 5/1978 | Japan | 330/257 |
| 138906 | 10/1980 | Japan | 330/257 |

OTHER PUBLICATIONS

Designing With Operational Amplifiers, by Jerald Graeme, 1977, McGraw Hill, Chapter 5, pp. 126–148.
Applications of Operational Amplifiers, Third-Generation Techniques, J. G. Graeme, McGraw-Hill Book Company, 1973, pp. 119–132.

Primary Examiner—Stanley D. Miller
Assistant Examiner—Richard Roseen
Attorney, Agent, or Firm—P. J. Rasmussen; P. M. Emanuel; R. G. Coalter

[57] ABSTRACT

An amplifier, including a pair of emitter coupled non-complementary transistors operated at constant emitter, base and collector potentials, provides a bidirectional output current proportional to an AC signal to be rectified. The output current is applied to a common base connection of a pair of complementary emitter-coupled base-coupled transistors having a common emitter connection coupled via a linearizing feedback resistor to the base electrode of one of the amplifier transistors and via a load to a source of reference potential. The collector potentials of the complementary transistors are regulated and a full wave rectified output signal is produced by a cascade connection of complementary current mirror amplifiers having inputs coupled to the collector electrodes of the complementary transistors and an output coupled to the point of reference potential via a further load thereby providing the combined advantages of improved linearity and dynamic range characteristic of feedback types of rectifiers and improved stability and wide bandwidth characteristic of feedforward rectifiers.

3 Claims, 2 Drawing Figures

FULL WAVE RECTIFIER CIRCUIT FOR SMALL SIGNALS

BACKGROUND OF THE INVENTION

This invention relates to rectifier circuits and particularly to full wave rectifier circuits for providing an output signal linearly related to the absolute value of an AC input signal supplied thereto.

The uses of full wave rectifier circuits are well known. An elementary form of full wave rectifier comprises a bridge connection of four diodes. Such an arrangement is inherently capable of wide bandwidth operation and is unconditionally stable but suffers the disadvantage of being highly non-linear for AC input signal levels near the "knee" of the diode characteristic curve. This limits the usefulness of such rectifier to high level signals of relatively limited dynamic range.

In certain applications the dynamic range of the AC input signal may be quite large, say, 60 dB or more. For example, in certain audio noise reduction systems it is required to rectify an audio signal which may range from a few millivolts to a few volts to generate a DC control voltage for operating an expansion or compression amplifier. Rectifier or absolute value circuits capable of linear operation over this signal range generally employ feedback techniques to reduce the effect of diode nonlinearities. See, generally, "APPLICATIONS OF OPERATIONAL AMPLIFIERS, THIRD GENERATION TECHNIQUES" by J. G. Graeme published in 1973 by the McGraw-Hill Book Company. Chapter 4, section 3, of the Graeme textbook (pp. 119-132) describes numerous absolute value circuits in which diodes are employed in the feedback path of operational amplifiers to provide linear rectification of wide dynamic range AC input signals.

One disadvantage of conventional feedback rectifier circuits is that phase compensation is required for stability and this greatly restricts the circuit bandwidth. Two techniques for reducing frequency response limitations due to phase compensation (and slew rate limitations) are described in section 4.3.3 of the Graeme textbook. One is an arrangement for effectively removing the phase compensation during switching transitions of the rectifier circuit. The other is a biasing circuit that reduces the switching transition voltage range. Such arrangements, however, require additional phase compensation capacitors and relatively complex temperature tracking bias networks.

A need exists for a full wave recitifer circuit having the stability and bandwidth advantages of a feedforward rectifier and the dynamic range and linearity advantages of a feedback rectifier. One prior art approach to meeting this need is described in U.S. Pat. No. 4,336,586 of G. K. Lunn which issued June 22, 1982. The Lunn arrangement employs a pair of non-linear but symmetrical full wave rectifiers having substantially identical transfer characteristics. The AC input signal is rectified by one of the non-linear rectifiers and the resultant signal is fed via a current mirror amplifier (CMA) to the input of an amplifier having a feedback path including the other non-linear rectifier. In operation, the nonlinearities of the first rectifier are effectively cancelled by the identical nonlinearities of the second rectifier. The problem with such an approach is that, for cancellation to occur, the two rectifier circuits must have identical transfer characteristics. This is difficult to achieve in practice, particularly where the dynamic range of the input signal is large and where the circuit may be subject to thermal gradients or other differences in operating conditions.

SUMMARY OF THE INVENTION

An object of the invention is to provide a full wave rectifier circuit in which parameters such as stability, bandwidth, dynamic range and linearity are improved and which does not require circuit elements having precisely matched non-linear characteristics.

A full wave rectifier circuit embodying the invention includes an amplifier means responsive to an AC input signal to be rectified for providing a bidirectional output current proportional to the AC input signal, the amplifier means including first and second non-complementary emitter-coupled transistors biased for operation at substantially constant emitter, base and collector potential levels. Third and fourth complementary emitter-coupled and base-coupled transistors are coupled at a common base connection thereof to receive the bidirectional output current and coupled at a common emitter connection thereof via a first circuit path to the base electrode of one of the first and second transistors and coupled via a second circuit path to a point of reference potential. The collector electrodes of the complementary transistors are coupled to respective inputs of a pair of complementary mirror amplifiers that are cascade connected, the second current mirror amplifier of the cascade connection having an output coupled via a load to the point of reference potential for developing a full wave rectified output voltage thereacross.

DETAILED DESCRIPTION OF THE PREFERRED EMBODIMENT

Figure 1:
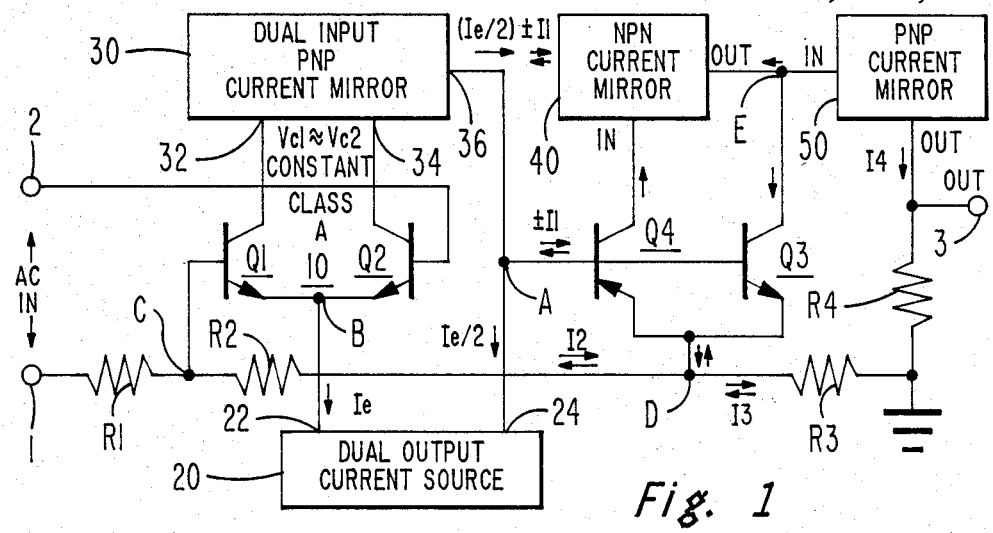
FIG. 1 is a circuit diagram, partially in block form of a full wave rectifier circuit embodying the invention.

The rectifier circuit of FIG. 1 includes an amplifier 10 having a pair of input terminals 1 and 2 for receiving an AC input signal to be rectified and an output node A for providing a bidirectional output current I1 represenative of the magnitude and polarity of the AC input signal. Terminal 1 is coupled via an input resistor R1 to the base electrode of an NPN transistor Q1 which is emitter coupled with a second NPN transistor Q2 having a base electrode connected to terminal 2. The common emitter connection (node B) of the non-complementary emitter coupled pair Q1–Q2 is connected to the first output 22 of a dual output current source 20 for receiving an emitter current Ie. Thus connected, transistors Q1 and Q2 apportion the emitter current Ie between their respective collector electrodes in accordance with the magnitude and polarity of the AC input signal. If, for example, terminal 1 is more positive than terminal 2, then transistor Q1 will conduct a greater share of current Ie than transistor Q2. The converse results if terminal 1 is less positive than terminal 2 and the current Ie is equally divided by transistors Q1 and Q2 when terminals 1 and 2 are at equal potentials.

For purposes of establishing a DC reference level, either of terminals 1 and 2 may be connected to a suitable reference potential point. In this specific example of the invention, it will be assumed that terminal 2 is connected to ground and that the AC signal is applied to terminal 1 from a ground referenced signal source (not shown) or is AC coupled via a DC blocking capacitor (not shown) to terminal 1 from a non-ground referenced AC signal source.

The collector load for transistors Q1 and Q2 of amplifier 10 comprises a dual input (PNP) current mirror amplifier 30 having a first input 32 connected to the collector electrode of transistor Q1, a second input 34 connected to the collector electrode of transistor Q2 and an output 36 connected to node A and to a second output 24 of current source 20 which withdraws current from node A equal to Ie/2. Current mirror amplifier 30 receives the collector currents of transistors Q1 and Q2 and supplies current to node A having a quiescent component equal to Ie/2 and a dynamic component I1 that is related to the relative magnitudes of the collector currents. If, for example, the collector current of transistor Q1 is greater than that of transistor Q2, then the component I1 will be of a sense to oppose the quiescent component Ie/2 and a diminished current will be supplied to node A. Conversely, if the collector current of transistor Q2 exceeds that of transistor Q1, then the component I1 will be in a sense to augment Ie/2 and an increased current will flow to node A. For equal Q1 and Q2 collector currents, the dynamic component I1 is zero and only the quiescent component Ie/2 flows to node A.

From the foregoing, it is apparent that the quiescent or common mode component Ie/2 of the output current of amplifier 30 is cancelled at node A by the equal and opposite current provided by current source 20 leaving only the dynamic or differential mode component I1 which is related to the AC input signal. Since the sum of currents at a circuit node must equal zero, it is apparent that the impedance (e.g., stray capacitive, etc.) associated with node A will be charged and discharged by the current I1 thereby producing very large voltage variations. As the node impedance increases the open loop voltage gain of the amplifier increases correspondingly until limited by such factors as base loading effects, stray capacitive effects, etc.

Amplifier 10 is operated in a closed loop mode by means of feedback provided by the paralleled base-emitter junctions of common-base common-emitter connected complementary transistors Q3 and Q4. The common base connection is coupled to node A for receiving the bidirectional output current I1 of amplifier 10 and the common emitter connection (node D) is coupled to node C via a feedback resistor R2 thereby establishing a voltage gain (as to amplifier 10) proportional to the ratio $-R2/R1$ for the case where terminal 2 is assumed to be grounded (the minus sign signifies inversion). If, on the other hand, terminal 1 is grounded and the AC signal is applied to terminal 2, then the voltage gain (at node D) is given by the ratio $(R1+R2)/R1$. Accordingly, in the closed loop mode, the voltage at node D is rendered substantially independent of any nonlinearities in amplifier 10 or transistors Q3 and Q4.

At this point it is instructive to note that (1) node A is remote from the base electrodes of transistors Q1 and Q2 and (2) with the feedback loop closed, transistors Q1 and Q2 are constrained to operate at essentially constant collector, emitter and base potentials. The remoteness of node A minimizes the possiblity that the node A voltage would be coupled to the base of transistor Q1 (where it would be degenerative, thus reducing the loop gain) or to the base of transistor Q2 (where it would be regenerative, thus enabling the possible occurrence of instabilities or oscillations). Regulation of the base. emitter and collector potentials of transistors Q1 and Q2 virtually eliminates the Miller effect and aids stability. The improvement in stability is so pronounced that the overall full wave rectifier circuit requires little or no phase compensation. The voltage regulation results because the collector voltages are maintained at constant (substantially equal) potentials because of the low input impedance at inputs 32 and 34 of current mirror amplifier 30. The node B voltage is forced to equal the potential at terminal 2 (a constant) less the threshold voltage of transistor Q2 and the node C voltage is forced to equal the terminal 2 voltage because of negative feedback provided by resistor R2.

Transistors Q3 and Q4, in addition to serving as a portion of the feedback path of amplifier 10, also serve as a common linking element to a feedforward circuit that provides rectification of the feedback current I2 flowing in resistor R2 and a further current I3 flowing in a first load resistor R3 coupled between node D and ground.

In detail, for negative excursions of an AC signal at terminal 1, node D is positive with respect to the reference potential (ground), current I3 flows through resistor R3 to ground and current I2 flows through resistor R2 to the virtual ground established at node C by the negative feedback. In this condition, the currents I1 and I2 are conducted solely by the NPN transistor Q3 (PNP transistor Q4 is reverse biased). Conversely, when the node D voltage reverses (positive excursions of the AC signal), the currents I2 and I3 reverse directions and are conducted solely by PNP transistor Q4 (NPN transistor Q3 is reverse biased). Transistors Q3 and Q4 thus channel or switch the composite current I2 and I3 into two paths depending on the sense (i.e., direction) of the current flow.

The remaining elements of the "feedforward" portion of the rectifier current comprises means for: (1) regulating the collector potentials of transistors Q3 and Q4 at different but substantially constant values; (2) compensating for forward transfer current gain differences between the complementary transistors; (3) reversing the direction of collector current flow of transistor Q4; (4) combining the reversed and non-reversed collector currents to provide a resultant current I4; (5) developing an output voltage proportional to the resultant current; and (6) establishing a predetermined rectifier circuit output resistance. These six functions are provided by only three elements, namely, a pair of complementary NPN and PNP cascade connected current mirror amplifiers 40 and 50 and a second load resistor R4. The inputs of amplifiers 40 and 50 are connected to respective ones of the collector electrodes of transistors Q4 and Q3. The output of amplifier 50 has an output connected to output terminal 3 and coupled to ground via load resistor R4.

In operation of this portion of the rectifier circuit, the low input impedance of NPN current mirror amplifier 40 maintains the collector electrode of PNP transistor Q4 at a substantially constant positive potential. This essentially eliminates degenerative Miller effects for transistor Q4 thereby providing improved bandwidth. Mirror 40 also reverses the direction of the Q4 collector current so as to be of the same sense with respect to node E (the input of amplifier 50) as the collector current of transistor Q3. In integrated circuit applications of a type where PNP transistors are of lateral construction and NPN transistors are of vertical construction, the lateral PNP transistor will exhibit a somewhat lower current gain than the vertical NPN. This may be compensated for by setting the current gain of mirror 40 to be greater than unity in accordance with the ratio of the current gain of transistor Q3 divided by that of transistor Q4.

PNP current mirror amplifer 50 senses the currents produced by amplifier 40 and transistor Q3 and also regulates the node E potential at a substantially constant positive value thereby minimizing the Miller effect for NPN transistor Q3 and improving its bandwidth. Amplifier 50 also reverses the direction of flow of the currents supplied to its input and provides a high output impedance source of current I4 to load resistor R4 which, in turn, develops the rectifier circuit output voltage and is the principal element for determining the circuit output impedance.

A further feature of the invention to be considered relates to the relative ease with which parameters such as input impedance, gain and output impedance (all interactive) may be manipulated individually to suit a given application. Specifically, the overall gain of the rectifier circuit may be considered as being the product of the gains of the feedback sections and the feedforward sections. The feedback section gain for the configuration where terminal 2 is at reference potential (ground) is simply −R2/R1 as previously explained. The feedforward section gain is more complex being established by the value of resistor R4 divided by the parallel combination of the values of resistor R2 and R3. The input impedance (where terminal 2 is grounded) is simply the value of resistor R1 and the output impedance is always substantially equal to the value of resistor R4. Thus, for any desired input/output impedance ratio one may readily determine the values of resistors R1 and R4, and then select resistors R2 and R3 to satisfy a desired gain requirement from the aforementioned relationships.

Figure 2:
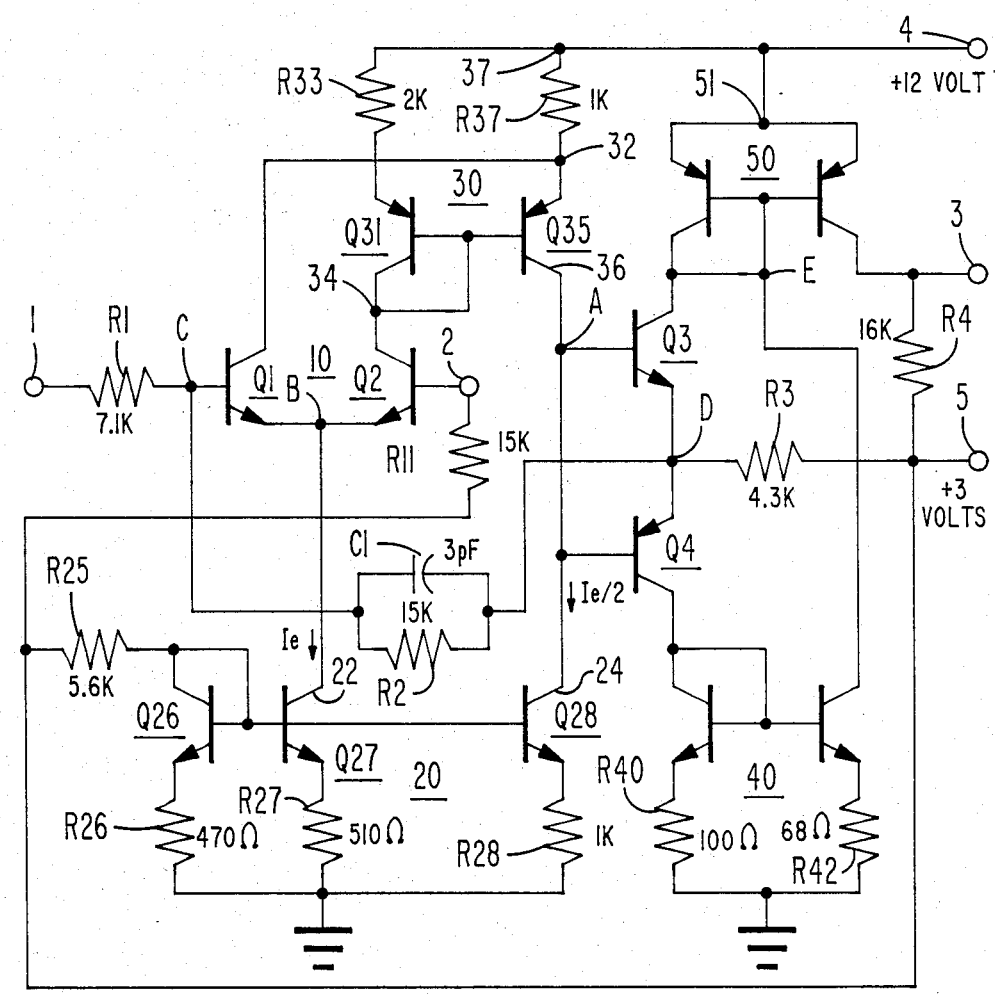
FIG. 2 is a detailed circuit diagram illustrating a specific implementation of the full wave rectifier circuit of FIG. 1.

The specific circuit example of FIG. 2 of the full wave rectifier circuit of FIG. 1 is suitable for construction in integrated circuit form and is intended for use with a unipolar or "single-ended" power supply and provides specific examples of the current source 20 and current mirror amplifiers 30, 40 and 50. Exemplary values for all resistors are shown. The circuit differs from that of FIG. 1 is that a small (3 pico-Farad) phase compensation capacitor C1 is connected in parallel with feedback resistor R2. Capacitor C1 may be readily implemented in an integrated circuit and requires very little "chip" area. Since the rectifier circuit features inherently high stability, capacitor C1 could be eliminated. However, its inclusion in integrated circuit rectifiers may well transform "marginal" chips into "satisfactory" chips thereby improving the integrated circuit production yield.

The reference potential level in this example of the invention is selected to be one quarter (3 volts) of the supply voltage (12 volts). The 12 volt supply (not shown) is applied to an input terminal 4 that is coupled to the common terminals 37 and 51 of PNP current mirror amplifiers 30 and 50 respectively. The reference potential is applied to an input terminal 5 to which resistors R3 and R4 are connected. Terminal 2 is coupled to terminal 5 via a resistor R11 equal in value to resistor R2. The AC signal is coupled to terminal 1 via a DC blocking capacitor (not shown) whereby resistors R2 and R11 equalize the input bias current offsets of transistors Q1 and Q2 respectively.

Current source 20 comprises an NPN current mirror amplifier having a diode connected input transistor Q26 coupled to ground via resistor 26, to terminal 5 via resistor 25 and to the base electrodes of a pair of NPN output transistors Q27 and Q28 having respective emitter resistors R27 and R28 connected to ground. For the resistor values given, the collector current (Ie) of transistor Q27 is twice that of transistor Q28.

The dual input current mirror amplifier 30 comprises a diode connected PNP transistor 31 coupled at the emitter thereof to supply terminal 4 (the 12 volt supply connection) via resistor R33 and at the collector and base thereof to input node 34. The emitter of output transistor 35 is coupled to terminal 4 via resistor R37 and (at node 32) to the collector of transistor Q1. The base and collector electrodes of transistor 35 are coupled, respectively, to nodes 34 and A. For the resistor values shown, the quiescent collector current of transistor Q35 is equal to Ie/2. Resistor R37 provides a low impedance path to terminal 4 for regulating the voltage at the collector of transistor Q1 at slightly less than 12 volts. Transistor Q31 and resistor R33 provide a low impedance path to terminal 4 for regulating the collector voltage of transistor Q2 at slightly less than 12 volts for the reasons previously discussed.

Current mirror amplifiers 40 and 50 are conventional except that amplifier 40 includes unequal emitter degeneration resistors R40 and R42 scaled to provide a current gain greater than unity to compensate for the relatively low "beta" of PNP transistor Q4 relative to that of NPN transistor Q3 as previously explained. Overall operation of the rectifier circuit is the same as that previously described for FIG. 1.

What is claimed is:

1. A full wave rectifier circuit comprising:
amplifier means responsive to an AC input signal to be rectified for providing a bidirectional output current proportional to said AC input signal, said amplifier means including an inverting input terminal and a non-inverting input terminal first and second non-complementary emitter coupled transistors biased for operation at substantially constant collector, emitter, and base potential levels, said base of one of said first and second transistors connected to said inverting input terminal, and said base of other one of said first and second transistors connected to said noninverting input terminal;
a first resistor coupled to apply said AC input signal to said inverting input terminal of said amplifier means;
third and fourth complementary emitter-coupled base-coupled transistors having a common base connection for receiving said bidirectional output current and a common emitter connection coupled via a second resistor to said inverting input terminal and coupled via a third resistor to a point of reference potential; and
a cascade connection of first and second complementary current mirror amplifiers, the input of each being connected to the collector electrode of a respective one of said complementary transistors, the second current mirror amplifier having an output coupled to said point of reference potential via a fourth resistor for developing a full wave rectified output voltage, said first, second, third and fourth resistors being selected to provide a predetermined gain for said full wave rectifier.

2. A full wave rectifier circuit as recited in claim 1 wherein said third transistor comprises a vertical NPN bipolar transistor, wherein said fourth transistor comprises a lateral PNP bipolar transistor and wherein the current gain of the first current mirror amplifier of said cascade connection is greater than unity in proportion to the ratio of the current gains of said third and fourth transistors.

3. A full wave rectifier circuit as recited in claim 1 wherein said amplifier means includes a third current mirror amplifier having an input transistor and an output transistor, each having a respective emitter resistor coupled to a common supply terminal, the emitter electrode of said output transistor being connected to the collector electrode of one of said first and second transistors, the base electrode of said output transistor being connected to the base and collector electrodes of said input transistor and being also connected to the collector electrode of the other of said first and second transistors, and wherein the ratio of said emitter resistors is selected to bias said output transistor to provide a predetermined quiescent output current at the collector electrode thereof.

* * * * *